US 7,110,770 B2

United States Patent
Stephens et al.

(10) Patent No.: US 7,110,770 B2
(45) Date of Patent: Sep. 19, 2006

(54) NETWORK ELEMENT SYSTEM METHOD COMPUTER PROGRAM AND DATA CARRIER FOR NETWORK OPTIMISATION

(75) Inventors: Paul Stephens, Twyford (GB); Gemma Paris, Swindon (GB); Tim Charity, Market Lavington (GB); Michael Stephen Ratford, Bath (GB); Patrick Joseph Cronin, Cork (IE)

(73) Assignee: Motorola, Inc., Schaumburg, IL (US)

( * ) Notice: Subject to any disclaimer, the term of this patent is extended or adjusted under 35 U.S.C. 154(b) by 21 days.

(21) Appl. No.: 10/484,941

(22) PCT Filed: May 27, 2002

(86) PCT No.: PCT/EP02/05828

§ 371 (c)(1),
(2), (4) Date: Sep. 7, 2004

(87) PCT Pub. No.: WO03/010987

PCT Pub. Date: Feb. 6, 2003

(65) Prior Publication Data

US 2005/0020254 A1  Jan. 27, 2005

(30) Foreign Application Priority Data

Jul. 24, 2001 (GB) ................. 0118121.3

(51) Int. Cl.
*H04Q 7/20* (2006.01)
*H04B 17/00* (2006.01)

(52) U.S. Cl. .................. 455/446; 455/67.11; 455/419; 370/254

(58) Field of Classification Search .............. 455/423, 455/424, 67.11, 67.14, 425, 560, 446, 453, 455/561, 403, 447, 67.12, 67.13, 418, 419, 455/420; 370/252, 277, 319, 321, 326, 328, 370/329, 478, 480, 203, 204, 254; 703/2, 703/3, 5

See application file for complete search history.

(56) References Cited

U.S. PATENT DOCUMENTS

| 5,561,841 | A | | 10/1996 | Markus |
| 5,854,903 | A | * | 12/1998 | Morrison et al. ........... 709/249 |
| 5,970,064 | A | * | 10/1999 | Clark et al. ................. 370/351 |
| 6,052,584 | A | * | 4/2000 | Harvey et al. .............. 455/423 |
| 6,069,894 | A | * | 5/2000 | Holender et al. ........... 370/397 |
| 6,445,917 | B1 | * | 9/2002 | Bark et al. .................. 455/423 |
| 6,519,452 | B1 | * | 2/2003 | Agostino et al. ........... 455/423 |
| 6,745,011 | B1 | * | 6/2004 | Hendrickson et al. ... 455/67.11 |
| 6,925,066 | B1 | * | 8/2005 | Chekuri et al. ............. 370/319 |
| 2004/0203719 | A1 | * | 10/2004 | Ross et al. .................. 455/423 |

* cited by examiner

FOREIGN PATENT DOCUMENTS

WO  WO 96 38012 A  11/1996

*Primary Examiner*—Charles N. Appiah
(74) *Attorney, Agent, or Firm*—Steven A. May; Brian M. Mancini

(57) ABSTRACT

A system is provided for optimisation processing in a cellular communications network having a central element (30) and a number of distributed network elements (40, 42, 44, 46, 48, 50). Each network element (40–50) is coupled to the central element, and each is arranged to obtain optimisation data and has a pre-processing arrangement (120) for pre-processing the optimisation data. The central element (30) then receives and processes this pre-processed optimisation data to produce optimisation code for optimising the performance of the network. In this way less data needs to be backhauled to the central element (30), and less processing is required at the central element (30), thereby improving the scalability of the network.

18 Claims, 2 Drawing Sheets

NETWORK ELEMENT SYSTEM METHOD COMPUTER PROGRAM AND DATA CARRIER FOR NETWORK OPTIMISATION

FIELD OF THE INVENTION

This invention relates to cellular Radio-Frequency (RF) networks and particularly but not exclusively to network optimisation processing in such networks.

BACKGROUND OF THE INVENTION

In the field of this invention cellular networks include a number of network elements (such as base stations) which operate using call processing software. Such software is updated periodically by the manufacturer of the network element. Typically these software updates are downloaded from an Operations and Maintenance Center (OMC) when a new software release is available for the Network Element.

It is also desirable to be able to optimise the performance of the network as a whole. Such optimisation is typically performed by an optimisation manager.

Referring now to FIG. 1, there is shown a prior art cellular network such as a GSM (Global System for Mobile communication) network. An optimisation manager 5 which may be part of or co-located with the OMC of the network is coupled via first and second Base Station Controllers (BSCs) 7 and 9 respectively to a number of Base Stations 10, 12, 14, 16, 18, 20. Each of the Base stations 10–20 and the BSCs 7 and 9 are network elements of the network.

Each base station 10–20 typically provides a 'cell' of the network, and contains a number of operating parameters for the cell such as power settings, frequency settings and the like. These parameters may be adjusted in order to optimise power consumption, signal quality and other characteristics of the cell.

Typical optimisation architecture is based on the collection of a significant amount of data from the cells, which is then processed centrally to provide reports for each cell and combined recommendations for topological planning. This is done by the optimisation manager 5 'backhauling' measurement data from each base station, and then processing this backhauled data using performance optimisation algorithms in order to provide the reports and recommendations.

Considering the first base station 10 and its associated cell, measurements from the cell are backhauled to the optimisation manager 5 periodically, where they are processed to derive optimised parameter settings for the base station 10, as well as the combined recommendations.

A problem with this arrangement is that a large amount of optimisation data must be sent from each network element to the optimisation manager 5 (illustrated by the thick lines of FIG. 1).

Furthermore all of the optimisation data must be processed at the optimisation manager 5 (illustrated by the dial 6). This restricts the expansion of the network, as each additional cell leads to a further increase in the amount of optimisation data to be transferred and processed, and requires that the processor at the OMC/optimisation manager 5 be highly specified in order to achieve optimisation results and hence optimise the performance of the network in a reasonable time period.

A need therefore exists for a network element, system, method, computer program and data carrier wherein the abovementioned disadvantages may be alleviated.

STATEMENT OF INVENTION

In accordance with a first aspect of the present invention there is provided a network element as claimed in claim 1.

In accordance with a second aspect of the present invention there is provided a system as claimed in claim 2.

In accordance with a third aspect of the present invention there is provided a method as claimed in claim 8.

In accordance with a fourth aspect of the present invention there is provided a method as claimed in claim 11.

In accordance with a fifth aspect of the present invention there is provided a computer program as claimed in claim 12.

In accordance with a sixth aspect of the present invention there is provided a data carrier as claimed in claim 13.

Preferably each arrangement for providing element optimisation pre-processing includes an arrangement for downloading software to enable element optimisation pre-processing. Each network element preferably has a processor partition arrangement such that separate processes operate for call processing and optimisation processing. Preferably the processor partition arrangement comprises a contention scheme which gives priority to call processing. Alternatively, the processor partition arrangement preferably comprises more than one processor.

Preferably the element optimisation processing includes an arrangement for providing processed element optimisation data directly to the network element, so that localised optimisation is provided at each network element.

The optimisation processing preferably comprises a number of interrelated part-processes and the pre-processing of element optimisation data comprises those part-processes of the optimisation processing which only require the optimisation data available at each network element. Preferably the element operating parameters contain measurement and messaging information relating to the element.

In this way cellular network optimisation processing is performed in a distributed manner at each of the network elements, thereby reducing data backhaul requirements, central processing requirements, and providing much greater scalability. Furthermore, localised optimisation of each network element is also facilitated.

BRIEF DESCRIPTION OF THE DRAWINGS

One network element, system, method, computer program and data carrier for network optimization incorporating the present invention will now be described, by way of example only, with reference to the accompanying drawings, in which.

DETAILED DESCRIPTION OF A PREFERRED EMBODIMENT

Figure 2:
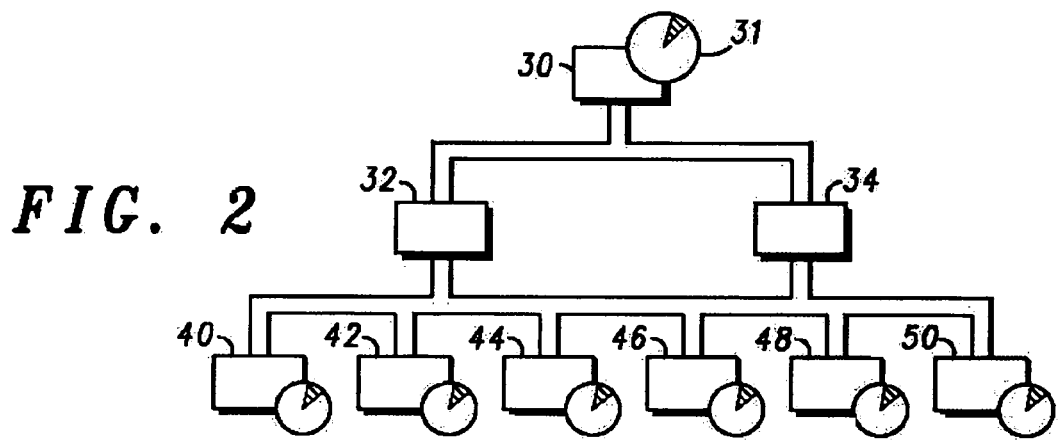
FIG. 2 shows a block-schematic diagram of a cellular communications system in which the invention may be used.

Referring to FIG. 2, there is a block-schematic diagram of a GSM cellular communications system. An optimisation manager 30 is coupled via BSCs 32 and 34 to a number of base stations 40, 42, 44, 46, 48, 50, which typically control a cell of the network. Each of the base stations 40–50 and the optimisation manager 30 has a diagrammatic representation of a dial indicating the amount of optimisation processing which takes place thereat. This will be further explained below.

Briefly stated, in operation each of the base stations 40–50 operates as a flexible optimisation processing platform, in a manner to be further described below. In this way the processing of measurement data is partially distributed to each network element, as illustrated by the dials of base stations 40–50.

Figure 3:
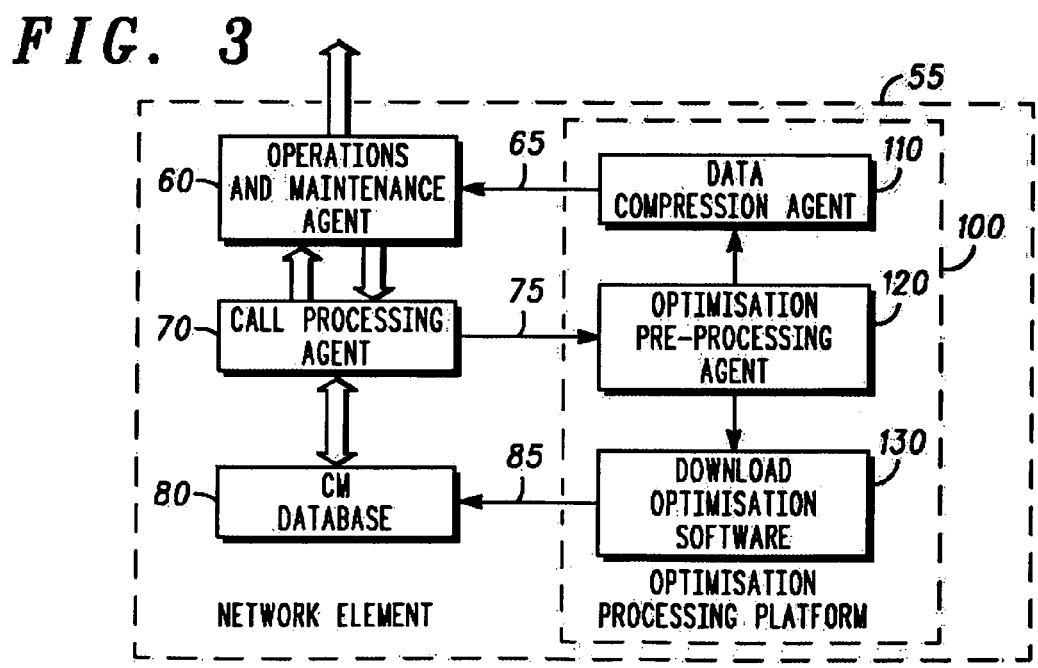
FIG. 3 shows a network element forming part of the cellular communications system of FIG. 2.

Referring now also to FIG. 3, there is shown a network element 55 of a cellular network, such as the base station 40 of the network of FIG. 2. The network element 55 has an operations and maintenance agent 60 which is arranged to control data transfer to the optimisation manager 30, a call processing agent 70 which executes call processing, a configuration management database 80 which contains operating parameters for the network element 55, and an optimisation processing platform 100.

The optimisation processing platform 100 has a data compression engine 110, an RF measurement report pre-processing engine 120, and downloaded optimisation software 130. The operation of each of these elements will be further described below.

Figure 4:
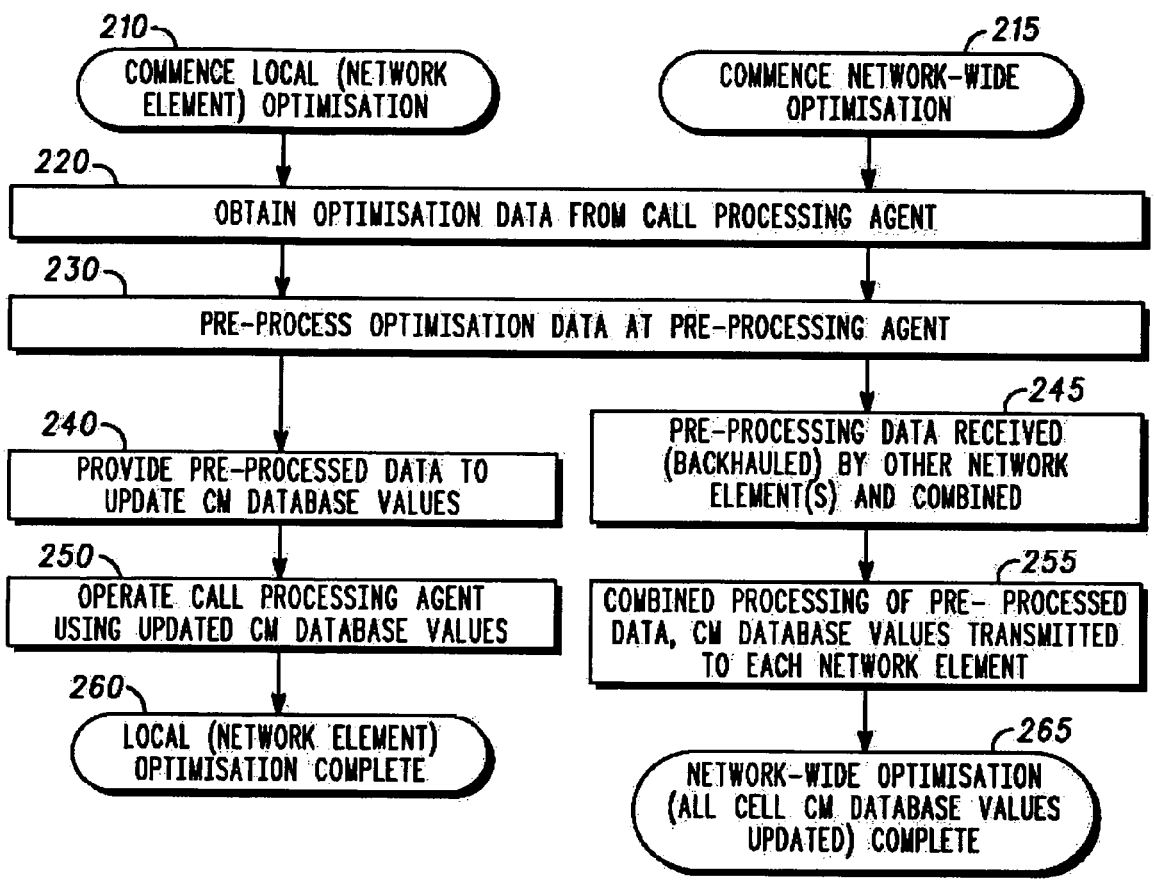
FIG. 4 shows an illustrative flow diagram of an optimisation process using the system of FIG. 2 and the network element of FIG. 3.

The flow diagram of FIG. 4 shows the process which takes place at an individual network element when performing local optimisation on the left side (boxes 210, 220, 230, 240, 250 and 260) and network-wide optimisation on the right side (boxes 215, 220, 230, 245, 255 and 265).

In operation, and referring now also to FIG. 4, network-wide optimisation is initiated by the optimisation manager 30 (box 215). The optimisation processing for any one network element, such as network element 40, can be notionally sub-divided into those part-processes which require optimisation data not available in network element 40 (such as information from neighbouring network element 42) and those part-processes which only require the element optimisation data which is available in the network element 40. Since the majority of the optimisation processing is found in the latter category (i.e. cell specific and not dependent upon data from surrounding network elements) it is therefore possible to distribute this cell specific processing to the network element 40.

Each network element collects element optimisation data from within its own cell (box 220). This data contains element operating parameters including measurement and messaging information, which may be extracted from 'call trace' information taken from each call made by a mobile unit operating in the cell of the network element. The data includes signal strength values, quality measurements, timing information and the like.

In the network element 55, call trace information is extracted from the call processing agent 70 by the pre-processing agent 120 (arrow 75), where element optimisation pre-processing (box 230) takes place (that is, those portions of optimisation processing which can be done without requiring information from other network elements).

Figure 1:
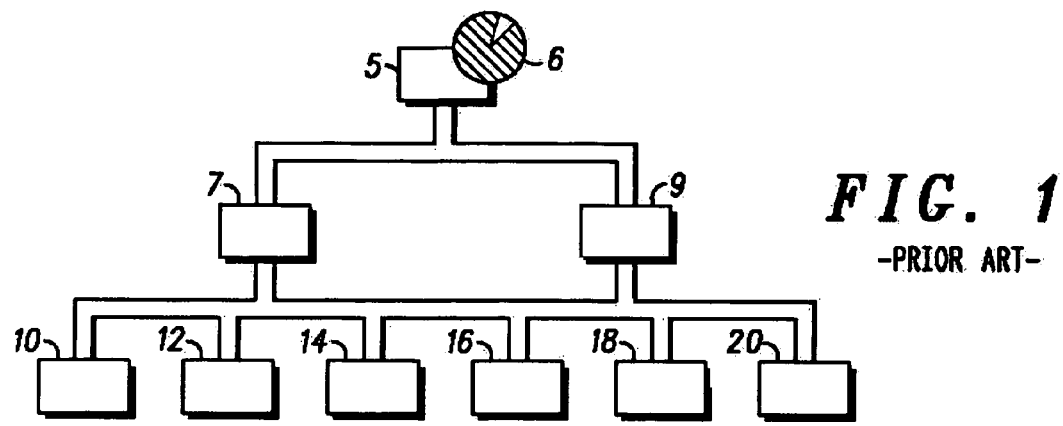
FIG. 1 shows a block-schematic diagram of a prior art communications system

This pre-processed element optimisation data is then compressed by the data compression agent 110, before being sent to the operations and maintenance agent 60 (arrow 65) for backhaul by the optimisation manager 30 (box 245). This significantly reduces the data backhaul load since a) it is compressed, and b) the processed data which is backhauled is far less than unprocessed data would be. The central processing of the optimisation manager 30 has only to deal with the combination and integration of the results of the distributed processing (as shown by the dial 31, in comparison to the dial 6 of FIG. 1. This therefore provides reduced backhaul requirements, reduced central processing requirements, and therefore much greater scalability.

The optimisation manager 30 then completes the optimisation processing and provides the results to the configuration management (CM) databases of each of the network elements (box 255). For the network element 55, the results (which are specific for each cell) may be downloaded via the operations and maintenance agent 60 and the call processing software 70 to the CM database 80 during a software release update of the call processing software 70. The network is then optimised (box 265).

However, it is also possible to download the results to the optimisation processing platform as the downloaded optimisation software 130. This can be used to update the CM database 80 (via the arrow 85) independently of the call processing software 70, thereby facilitating optimisation processing independently of call processing software release updates.

In this way the structure inherently also supports automatic local optimisation (commencing at box 210), whereby measurement data taken from the cell of the network element 55 (box 220) may be processed by the pre-processing agent 120 (box 230), and used by the downloaded optimisation software 130 to update the cell parameters in the Cell Management (CM) database 80 (arrow 85, box 240), independently of the rest of the network.

When the network element cell begins to function using the updated parameters from the CM database 80 (box 250), local optimisation is complete (box 260).

This 'localised' level of optimisation does not take account of measurement data or behaviour of neighbouring cells, and is therefore not as comprehensive as 'global' (i.e. network-wide) optimisation. However, it does provide partial optimisation, and significantly, a network element may be programmed to perform a 'localised' optimisation as often as is desired without any backhaul or central processing overhead.

Local optimisation may occur in conjunction with or independently of network-wide optimisation. In other words, the left-and right-hand parts of FIG. 4 may operate independently or together, as the diagram suggests. Obviously any local optimisation may be quickly superseded by network-wide optimisation, as the parameters provided by network-wide optimisation are the result of factoring in data from other cells.

The flexible processing platform 100 has a well-defined interface with the call processing software 70. It is important to ensure that call processing is protected by this interface such that any faults in the downloaded optimisation software 130 do not adversely affect the call processing activities of the network element 55. This is because optimisation software is subject to iterative improvement and is not typically tested as comprehensively as call processing software, therefore it is more liable to contain errors.

The downloaded optimisation software is thus completely independent of the call processing software 70. The architecture of the network element 55 is effectively partitioned, and may be defined in such a way that the call processing software 70 always has priority when processors are shared, or alternatively that separate processors are used for call processing and for optimisation. The call processing software 70 need not even be aware of any changes to the optimisation functionality of the network element 55.

It will be understood that the network element and system described above provides the following advantages:

Reduced backhaul of measurement data to the optimisation manager 30;

Improved scalability of the network;

Reduced central processing requirement at the optimisation manager 30;

Increased frequency of network optimisation; and

Inherent support for Automatic Optimisation at the Network Element 55.

It will be appreciated that alternate embodiments to the one described above are possible. For example, it will be understood that the above example of a GSM network is illustrative only, and the arrangement is applicable to any cellular network, including third generation cellular networks such as UMTS (Universal Mobile Telephone Standard) and CDMA (Code-Divided Multiple-Access) 2000.

Furthermore, the above example shows distributed and localised processing occurring only at the base station network elements 40–50. However the network may be arranged such that, for example, the posse station controller elements 32 and 34 may provides some further localised pre-processing of the pre-processed network element data from a number of the base station network elements 40–50. In other words pre-processing may be arranged to occur at each 'tier' of the network, where pre-processed data from the 'tier' belong is further processed to the extent possible and appropriate for that tier.

In the case of UMTS networks, it will be appreciated that distributed, localised processing may occur at the Node B level (equivalent to base station network elements 40–50) and also at RNC (Real Network Controller) level (equivalent to base station controller elements 32 and 34).

The invention claimed is:

1. A network element for sharing data optimization in a cellular communications network having a plurality of network elements and a central element, the central element being arranged to receive, combine and process element optimisation data from at least two of the plurality of network elements, the element optimisation data of each element containing element operating parameters, the network element comprising:

means for obtaining element optimisation data from within each network elements, wherein each network element has a processor partition arrangement to provide separate processes for call processing and optimization processing;

means for providing pre-processing of the element optimisation data in each network element optimization processing before sending it to the central element for further optimization processing; and means for sending the pre-processed element optimization data from each network element to the central element, which receives, combines and further optimizes the combined pre-processed element optimization data.

2. The network element of claim 1 wherein each means for providing element optimisation pre-processing includes means for downloading software to enable element optimisation pre-processing without affecting call processing activities of the network element.

3. The network element of claim 1 wherein the processor partition arrangement comprises a contention scheme which gives priority to call processing.

4. The network element of claim 1 wherein the network element compresses the pre-processed element optimization data before sending it to the central element.

5. The network element of claim 1 wherein the element optimisation processing includes means for providing processed element optimisation data directly to the network element, wherein localised optimisation is provided at each network element until superseded by optimization instructions from the central element.

6. The network element of claim 1 wherein the optimisation processing comprises a plurality of interrelated part-processes and the pre-processing of element optimisation data comprises those part-processes of the optimisation processing which only require the element optimisation data available at each network element.

7. A system for sharing optimisation processing in a cellular communications network, comprising:

a central element having means for receiving, combining and processing element optimisation data that has been pre-processed in a plurality of network elements to produce optimisation code for the network; and a plurality of distributed network elements coupled to the central element, each network element having a processor partition arrangement to provide separate processes for call processing and optimization processing, and each network element having means for obtaining element optimisation data from within that network element and means for providing optimisation pre-processing of the element optimisation data in the each network element optimization processing before sending it to the central element for further optimization processing, the element optimisation data containing element operating parameters, the network elements operable to send the pre-processed element optimization data to the central element;

wherein each network element is arranged to pre-process its element optimisation data before it is sent to the central element, whereupon the pre-processed optimization data is received, combined and further optimized at the central element.

8. The system of claim 7 wherein each element is operable to download software to enable element optimisation pre-processing, which is independent of call processing software such that the network element can automatically update element parameters independent of the rest of the network.

9. The system as claimed in claim 8, wherein any local optimization of the network element is superseded by network-wide optimization.

10. The system of claim 7 wherein each means for providing element optimisation pre-processing includes means for downloading software to enable element optimisation pre-processing without affecting call processing activities of the network element.

11. The system of claim 7 wherein the processor partition arrangement comprises a contention scheme which gives priority to call processing.

12. The system of claim 7 wherein the network element compresses the pre-processed element optimization data before sending it to the central element.

13. The system of claim 7 wherein the element optimisation processing includes means for providing processed element optimisation data directly to the network element, wherein localised optimisation is provided at each network element.

14. The system of claim 7 wherein the optimisation processing comprises a plurality of interrelated part-processes and the pre-processing of element optimisation data comprises those part-processes of the optimisation processing which only require the element optimisation data available at each network element.

15. A method for sharing optimisation processing in a cellular communications network having a plurality of network elements having a processor partition arrangement such that separate processes operate for call processing and optimisation processing and a central element, the method comprising the steps of:
- obtaining element optimisation data at each network element, the element optimisation data of each element containing element operating parameters;
- pre-processing the element optimisation data at each network element;
- sending the pre-processed element optimization data to the central element;
- receiving and combining the pre-processed element optimisation data from each network element at the central element; and
- further processing the combined pre-processed optimisation data at the central element.

16. The method of claim 15 further comprising the step of providing the processed element optimisation data from each network element directly to that network element, wherein localised optimisation is provided at each network element.

17. The method of claim 15 wherein the optimisation processing comprises a plurality of interrelated part-processes and the pre-processing of element optimisation data comprises those part-processes of the optimisation processing which only require the element optimisation data available at each network element.

18. The method of claim 15 further comprising the step of compressing the pre-processed element optimization data before sending it to the central element.

* * * * *